Sept. 18, 1923.

C. F. REIFF

DRIVING MECHANISM FOR ORE CONCENTRATORS

Filed April 7, 1922    2 Sheets-Sheet 1

1,468,575

Carl F. Reiff, INVENTOR

BY

H. G. Burns ATTORNEY

Sept. 18, 1923.  C. F. REIFF  1,468,575
DRIVING MECHANISM FOR ORE CONCENTRATORS
Filed April 7, 1922   2 Sheets-Sheet 2
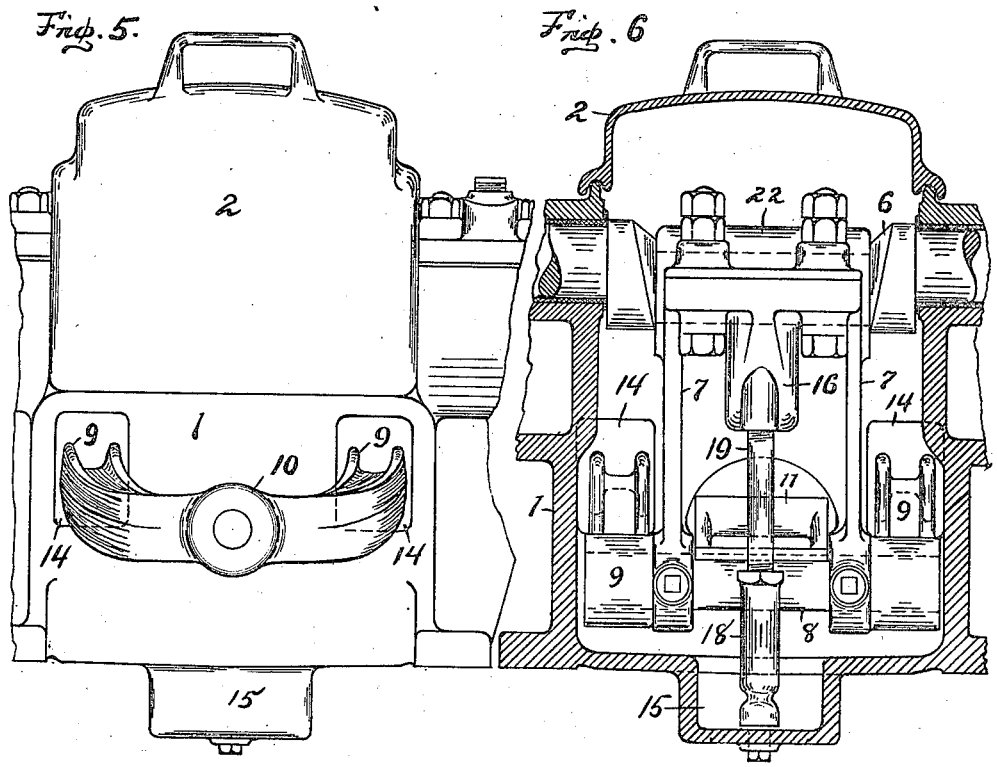
Carl F. Reiff, INVENTOR
BY ATTORNEY Patented Sept. 18, 1923.

1,468,575

UNITED STATES PATENT OFFICE.

CARL F. REIFF, OF FORT WAYNE, INDIANA, ASSIGNOR TO DEISTER CONCENTRATOR COMPANY, A CORPORATION OF INDIANA.

DRIVING MECHANISM FOR ORE CONCENTRATORS.

Application filed April 7, 1922. Serial No. 550,282.

*To all whom it may concern:*

Be it known that I, CARL F. REIFF, a subject of Germany, and resident of Fort Wayne, in the county of Allen and State of Indiana, have invented certain new and useful Improvements in Driving Mechanism for Ore Concentrators, of which the following is a specification.

This invention relates to improvements in driving mechanism for ore cencentrators and the object thereof is to provide an actuating mechanism, for concentrating tables, the moving parts of which are so constructed and arranged in conjunction with enclosing means that copious lubrication of its various wearing surfaces will be continuously maintained.

In the usual practice the bearing surfaces of the driving mechanism, owing to the high velocity, severe strain and protracted operation required, tend to become overheated which causes the lubricant to vanish and the bearing parts to cut and become destroyed. To circumvent this difficulty by providing means for continuously supplying ample lubrication to the various bearing parts of the mechanism and the provision for sheltering the bearing parts and the lubricant supply means is included as an object of the invention.

The foregoing objects are accomplished by the construction illustrated in the accompanying drawings in which:—

Fig. 5 is a front elevation of the mechanism partly broken away; and

Fig. 6 is a section of Fig. 1 on the line 6—6 thereof.

The characters appearing in the description refer to parts shown in the drawings and designated thereon by corresponding characters:

Figure 1:
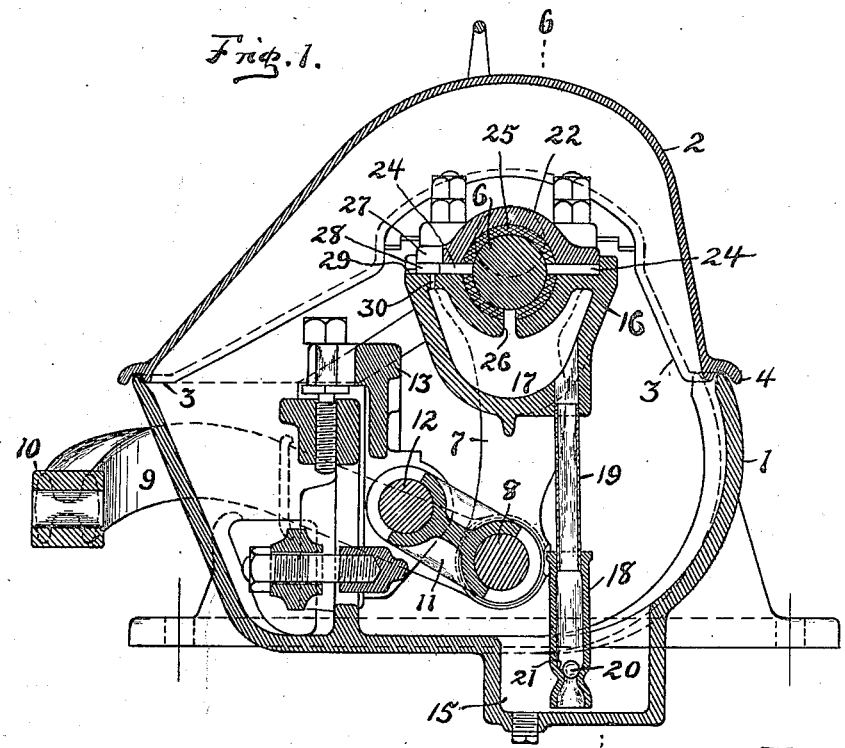
Fig. 1 is a transverse section of a driving mechanism embodying the invention.
Figure 2:
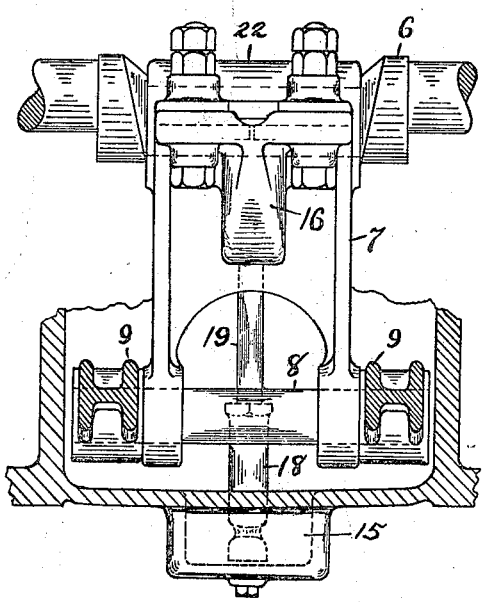
Fig. 2 is a detail view of a part of the mechanism shown in Fig. 1 in a plane at right angles thereto, including the pitman.
Figure 3:
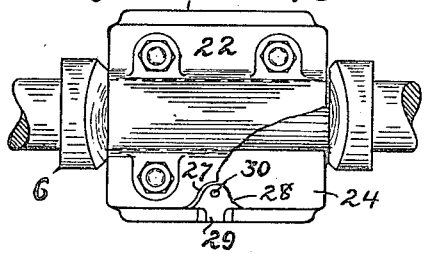
Fig. 3 is a detail plan view of the pitman, partly broken away.
Figure 4:
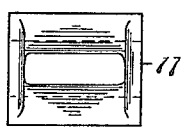
Fig. 4 is a plan view of a toggle used in the mechanism.

The invention is comprised of a driving mechanism arranged in conjunction with a housing which is adapted to contain a quantity of liquid lubricant, and means whereby the lubricant is circulated so that the bearing parts of the mechanism are continuously bathed therewith. The housing is comprised of a hollow base 1 surmounted by a hollow cover 2, the cover having a ledge 3 that depends within the base along its upper edge. The cover also has an external lip 4 extending around its lower edge that overhangs the corresponding meeting edge of the base.

The mechanism in the present instance, which is given as an example of the invention, consists of a crank-shaft 6 upon which is mounted a pitman 7 that has a pin 8 in its lower end. The pin has connection at its outer ends with the corresponding arms 9 of a yoke 10 which is for connection with a concentrating table (not shown) which is to be actuated. The pin 8 also has bearing relation with a toggle 11 that bears also upon a stationary pin 12 that is mounted in a frame 13 which is vertically adjustable in the base.

When the crank shaft is revolved movement is imparted to the yoke through the medium of the pitman guided by the toggle. The purpose of the invention is particularly to insure constant lubrication of the bearing surfaces of the pins 8 and 12 with the toggle, the bearing surfaces between the pin 8 and the yoke, and the bearing surfaces between the crank-shaft and the pitman.

The base 1 is constructed so as to hold a quantity of liquid lubricant, the level of which may rise to a point somewhat lower than the openings 14 through which the arms 9 of the yoke 10 enter the housing, and the base has in its bottom a sump 15 into which the lubricant recedes.

The head 16 of the pitman has a chamber 17 therein that has communication with an impulse pump 18 through a pipe 19 which is secured in the head. The pump has a ball valve 20 that rests upon a seat 21 near its lower open end, and the end of the pump extends into the sump and is reciprocated therein accordingly as the pitman is actuated.

A cap 22 is secured upon the head 16 of the pitman, there being a pair of shims 24 between the head and cap, and a pair of bushings 25 in the head and cap respectively bear upon the crank-shaft 6.

An opening 26 extends from the chamber 17 in the head through the lowermost bushing 25 for the passage of the lubricant from the chamber to the crank-shaft. The cap 22 has in its forward edge a recess 27, and the shim 24 has a corresponding recess 28, and the forward upper part of the head has a gap 29 adjacent said recesses. Also, the head has a discharge opening 30 extending from its chamber 17 and opening at the recess 28 in the shim.

In the operation of the invention, lubricating oil is placed in the base sufficient in quantity that the sump becomes filled and its level will rise approximately to reach the lower end of the pitman. When the shaft is rotated the pitman is caused to gyrate and the impulse pump which is attached to the head of the pitman is plunged into the sump causing the oil in the sump to rise past the valve of the pump. As the operation is continued the chamber in the head becomes filled with oil from the sump and the crank-shaft becomes lubricated through the opening 26. Also, the oil from the chamber passes out through the opening 30 into the recess 28 and flows out through the gap 29 and drops upon the toggle pin 12. The plunging movement of the pump into the oil filled sump causes the oil to be splashed upon the pin 8 at the lower end of the pitman. Thus, the lubricant is continuously supplied to all of the bearing parts of the mechanism contained within the housing.

What I claim is:—

1. A housing having a sump adapted to contain oil, a crank-shaft extending through the housing; a pitman actuated by the crank-shaft and having a chamber in its head; an impulse pump movable with the pitman adapted to deliver oil from the sump to said chamber; and a toggle mechanism in the housing actuated by the pitman, there being an opening for the passage of oil from said chamber to the crank-shaft and a discharge opening for the overflow of oil from said chamber onto the toggle mechanism.

2. In apparatus of the class described, a housing including a base adapted to contain oil; a driving member extending through the housing; a mechanism within the housing actuated by the driving member, said mechanism having a chamber in its head; and an impulse pump movable with said mechanism adapted to convey oil from said base into said chamber, there being means for the passage of oil from said chamber to the bearings of said mechanism.

3. In apparatus of the class described, a housing having a sump adapted to contain oil; a driving member extending through the housing; a hollow headed pitman actuated by the driving member and having an overflow outlet; a mechanism having bearings within the housing beneath said outlet; and an impulse pump movable with the pitman, extending into the sump and having communication with the hollow head thereof, said bearings being adapted to receive oil from said outlet.

4. In apparatus of the class described, a housing having a base adapted to contain oil; a driving member extending through the housing, a hollow headed pitman actuated by the driving member, and having an overflow outlet; a mechanism having bearings in the housing beneath the outlet in actuated relation with the pitman; and means for conveying oil from the base into the hollow head of the pitman as it is actuated.

In testimony whereof I affix my signature in presence of two witnesses.

CARL F. REIFF.

Witnesses:
C. J. METTLER,
MATILDA METTLER.